US011863582B2

(12) United States Patent
Gupta et al.

(10) Patent No.: US 11,863,582 B2
(45) Date of Patent: *Jan. 2, 2024

(54) GATEWAY DEPLOYMENT FOR A ZERO TRUST ENVIRONMENT

(71) Applicant: Sophos Limited, Abingdon (GB)

(72) Inventors: Prashil Rakeshkumar Gupta, Bangalore (IN); Biju Ramachandra Kaimal, Bangalore (IN); Venkata Suresh Reddy Obulareddy, Bangalore (IN)

(73) Assignee: Sophos Limited, Abingdon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/982,332

(22) Filed: Nov. 7, 2022

(65) Prior Publication Data

US 2023/0053702 A1  Feb. 23, 2023

Related U.S. Application Data

(63) Continuation of application No. 17/212,573, filed on Mar. 25, 2021, now Pat. No. 11,496,461.

(30) Foreign Application Priority Data

Feb. 23, 2021 (IN) .............................. 202111007638

(51) Int. Cl.
*H04L 9/40* (2022.01)
*G06F 9/4401* (2018.01)

(52) U.S. Cl.
CPC ........ *H04L 63/1433* (2013.01); *G06F 9/4416* (2013.01); *H04L 63/029* (2013.01); *H04L 63/0227* (2013.01); *H04L 63/0838* (2013.01); *H04L 63/0876* (2013.01); *H04L 63/1416* (2013.01); *H04L 63/20* (2013.01)

(58) Field of Classification Search
CPC ............ H04L 63/1433; H04L 63/0227; H04L 63/029; H04L 63/0838; H04L 63/0876; H04L 63/1416; H04L 63/0823; H04L 63/101; G06F 9/4416; G06F 21/57
See application file for complete search history.

(56) References Cited

U.S. PATENT DOCUMENTS 7,028,338 B1  4/2006 Norris et al.
7,404,205 B2  7/2008 Scoredos et al.
(Continued)

OTHER PUBLICATIONS

USPTO, "U.S. Appl. No. 17/212,550 Notice of Allowance dated Jun. 13, 2022", 8 pages.
(Continued)

*Primary Examiner* — Huan V Doan
(74) *Attorney, Agent, or Firm* — Strategic Patents, P.C.

(57) ABSTRACT

A virtualized gateway for applications in a zero trust network access environment is managed from a cloud-based threat management facility for an enterprise network. In order to facilitate creation of a new, centrally managed gateway, a one-time passcode for registration of the gateway to the threat management facility is encoded onto a virtual disk and distributed to a host platform along with a base gateway image for the gateway. This advantageously permits the new gateway to boot and securely register with the threat management facility without further administrative intervention.

20 Claims, 8 Drawing Sheets

(56) References Cited

U.S. PATENT DOCUMENTS

| | | |
|---|---|---|
| 2002/0091944 A1 | 7/2002 | Anderson et al. |
| 2012/0293220 A1 | 11/2012 | Li et al. |
| 2015/0378743 A1 | 12/2015 | Zellermayer et al. |
| 2018/0027020 A1 | 1/2018 | Pallas et al. |
| 2019/0104172 A1* | 4/2019 | Wu .................. G06F 8/63 |
| 2021/0058386 A1* | 2/2021 | Peter ............ H04L 63/0823 |
| 2022/0272082 A1 | 8/2022 | Gupta et al. |
| 2022/0272117 A1 | 8/2022 | Maheve et al. |
| 2023/0053301 A1 | 2/2023 | Maheve et al. |

OTHER PUBLICATIONS

USPTO, "U.S. Appl. No. 17/212,573 Notice of Allowance dated Jun. 22, 2022", 15 pages.

* cited by examiner

FIG. 8

Add Gateway

FQDN *
test1.company.com

Applications Domain *
company.com

DNS *
◉ DNS from DHCP
○ Static DNS

WAN IP Address *
○ DHCP  ◉ Static IP
IP Address *
10.23.1.1
Invalid IP

Subnet Mask *

Default Gateway *

LAN IP Address *
◉ DHCP  ○ Static IP

Certificate *
[+ Choose]

Private Key *
[+ Choose]

800

GATEWAY DEPLOYMENT FOR A ZERO TRUST ENVIRONMENT

CROSS-REFERENCE TO RELATED APPLICATIONS

This application is a continuation of U.S. patent application Ser. No. 17/212,573 filed on Mar. 25, 2021 and titled "Gateway Management for a Zero Trust Environment," which claims priority to Indian Provisional Patent Application No. 202111007638 filed on Feb. 23, 2021 and titled "Network Security for Zero Trust Network Environments," where the entire content of the foregoing applications are hereby incorporated by reference.

FIELD

The present disclosure relates to network security, and more specifically to network security in cloud-based and zero trust network environments.

BACKGROUND

Zero Trust Network Access (ZTNA) environments assume that there is no trusted network and no implicit trust applied to users and devices trying to access enterprise resources such as applications, services, and data. Instead, a typical ZTNA solution provide a software-defined perimeter for enterprise resources by separately authenticating each endpoint to each requested resource. This approach can significantly reduce security risks by limiting or preventing lateral movement throughout an enterprise network by a compromised device. However, there remains a need for improved centralized threat management for enterprises employing ZTNA solutions.

SUMMARY

A virtualized gateway for applications in a zero trust network access environment is managed from a cloud-based threat management facility for an enterprise network. In order to facilitate creation of a new, centrally managed gateway, a one-time passcode for registration of the gateway to the threat management facility is encoded onto a virtual disk and distributed to a host platform along with a base gateway image for the gateway. This advantageously permits the new gateway to boot and securely register with the threat management facility without further administrative intervention.

In one aspect, a method disclosed herein for deploying a centrally managed gateway for zero trust network access may include: retrieving a base image for a zero trust network access gateway, the base image including a bootable image of the zero trust network access gateway; retrieving configuration information including a client identifier for the zero trust network access gateway from a threat management facility; retrieving a one-time passcode for the client identifier from an identity management platform; creating a supplemental drive image for the zero trust network access gateway, the supplemental drive image including the configuration information and the one-time passcode for the zero trust network access gateway; and booting the zero trust network access gateway from the base image and the supplemental drive image, wherein the zero trust network access gateway is configured to register with the threat management facility using the client identifier and the one-time passcode stored on the supplemental drive image.

In one aspect, a system disclosed herein may include an identity management platform comprising one or more servers supporting authentication in a zero trust network environment, and a threat management facility for an enterprise network. The threat management facility may be hosted on a cloud computing platform and the threat management facility may include a processor and memory storing computer executable instructions that configure the threat management facility to perform the steps of: retrieving a base image for a zero trust network access gateway, the base image including a bootable image of the zero trust network access gateway, retrieving configuration information including a client identifier for the zero trust network access gateway from the threat management facility, retrieving a one-time passcode for the client identifier from the identity management platform, creating a supplemental drive image for the zero trust network access gateway, the supplemental drive image including the configuration information and the one-time passcode for the zero trust network access gateway, and causing the zero trust network access gateway to boot from the base image and the supplemental drive image, wherein the zero trust network access gateway is configured to register with the threat management facility using the client identifier and the one-time passcode stored on the supplemental drive image.

In one aspect, a computer program product disclosed herein may include computer executable code embodied in a non-transitory computer readable medium that, when executing on one or more computing devices, performs the steps of: retrieving a bootable image for a managed device; retrieving configuration information including a client identifier for the managed device from a threat management facility; retrieving a one-time passcode for the client identifier from an identity management platform; creating a supplemental drive image for the managed device, the supplemental drive image including the configuration information and the one-time passcode for the managed device; and causing the managed device to boot from the bootable image and the supplemental drive image, wherein the managed device is configured to register with the threat management facility using the client identifier and the one-time passcode stored on the supplemental drive image.

Implementations may include one or more of the following features. The system may further include a second cloud computing platform independent from the cloud computing platform, wherein causing the trust network access gateway to boot from the base image and the supplemental drive image includes causing the zero trust network access gateway to boot on the second cloud computing platform. Causing the managed device to boot may include automatically loading the bootable image to a virtualized boot device and loading the supplemental drive image onto a virtualized drive for the virtualized boot device. The computer program product may further include code that performs the step of automatically authenticate the client identifier with identity management platform using the one-time passcode and, in response to a successful authentication with the identity management platform, automatically register the managed device with the threat management facility. The managed device may be a virtual device. The bootable image may be in a virtualization format. The supplemental drive image may be an ISO image for a CD-ROM drive of a virtual machine. The configuration information may include one or more of local area network configuration information, wide area network configuration, and domain name service information. The configuration information may include one or more of a name for the managed device and a fully qualified domain name for the managed device. The configuration information may include one or more of a certificate for the managed device and a private key for the managed device. The managed device may include a gateway for zero trust network applications. The managed device may include a firewall for an enterprise network associated with the threat management facility. The managed device may include one or more of a wireless access point and a switch for an enterprise network associated with the threat management facility. The managed device may be a virtualized device executing in a virtualization environment. The managed device may be physically hosted on premises for an enterprise network associated with the threat management facility. The threat management facility may be hosted on a cloud computing platform. The managed device may be hosted on a cloud computing platform. The threat management facility may be hosted on a first cloud computing platform and the managed device may be hosted on a second cloud computing platform independent of the first cloud computing platform.

BRIEF DESCRIPTION OF THE DRAWINGS

The foregoing and other objects, features, and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 8 shows an administrative console for adding an application gateway for an enterprise network.

DESCRIPTION

Figure 1:
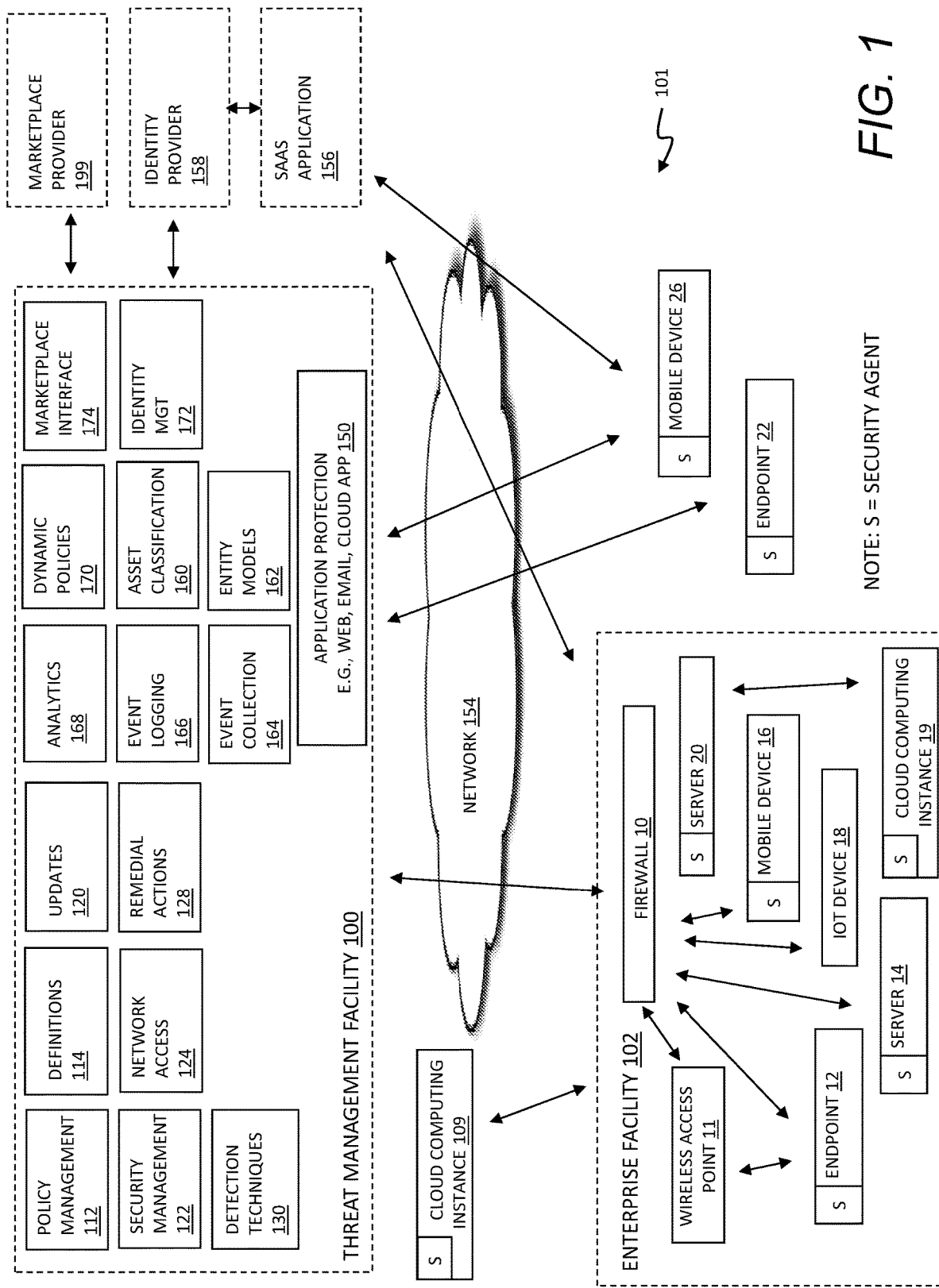
FIG. 1 depicts a block diagram of a threat management system.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances, or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

As described herein, a threat management system may use a Sensor, Events, Analytics, and Response (SEAR) approach to protect enterprises against cybersecurity threats.

FIG. 1 depicts a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

Just as one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications, and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, an exemplary enterprise facility 102 may be or may include any networked computer-based infrastructure. For example, the enterprise facility 102 may be corporate, commercial, organizational, educational, governmental, or the like. As home networks get more complicated and include more compute instances at home and in the cloud, an enterprise facility 102 may also or instead include a personal network such as a home or a group of homes. The enterprise facility's 102 computer network may be distributed amongst a plurality of physical premises such as buildings on a campus and located in one or in a plurality of geographical locations. The configuration of the enterprise facility as shown is merely exemplary, and it will be understood that there may be any number of compute instances, less or more of each type of compute instances, and other types of compute instances. As shown, the exemplary enterprise facility includes a firewall 10, a wireless access point 11, an endpoint 9, a server 14, a mobile device 16, an appliance or IOT device 18, a cloud computing instance 19, and a server 20. Again, the compute instances 10-20 depicted are exemplary, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 92, update facility 90, definitions facility 114, network access rules facility 94, remedial action facility 98, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility. Some or all of one or more of the facilities 100, 112-174 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 92.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In embodiments, the identity provider 158 may provide user identity information, such as multi-factor authentication, to a SaaS application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Exemplary commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network, or combination of these.

In embodiments, aspects of the threat management facility 100 may be provided as a stand-alone solution. In other embodiments, aspects of the threat management facility 100 may be integrated into a third-party product. An application programming interface (e.g., a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 92 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 92 may provide malicious code protection to a compute instance. The security management facility 92 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 9, in a wireless access point 11 or firewall 10, as part of application protection 150 provided by the cloud, and so on.

In an embodiment, the security management facility 92 may provide for email security and control, for example to target spam, viruses, spyware, and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 9, in a wireless access point 11 or firewall 10, as part of application protection 150 provided by the cloud, and so on.

In an embodiment, security management facility 92 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 9, in a wireless access point 11 or firewall 10, as part of application protection 150 provided by the cloud, and so on.

In an embodiment, the security management facility 92 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 9, in a wireless access point 11 or firewall 10, as part of application protection 150 provided by the cloud, e.g., from the threat management facility 100 or other network resource(s).

In an embodiment, the security management facility 92 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 9, in a wireless access point 11 or firewall 10, as part of application protection 150 provided by the cloud, and so on.

In an embodiment, the security management facility 92 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 9, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update management facility 90 may provide control over when updates are performed. The updates may be automatically transmitted, manually transmitted, or some combination of these. Updates may include software, definitions, reputations or other code or data that may be useful to the various facilities. For example, the update facility 90 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Exemplary rules include access permissions associated with networks, applications, compute instances, users, content, data, and the like. The policy management facility 112 may use a database, a text file, other data store, or a combination to store policies. In an embodiment, a policy database may include a block list, a blacklist, an allowed list, a whitelist, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 92 may access the rules within a policy facility to determine if the requested access is related to a sporting website.

The policy management facility 112 may include access rules and policies that are distributed to maintain control of access by the compute instances 10-26 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 92 for enforcement.

In embodiments, the threat management facility 100 may provide configuration management as an aspect of the policy management facility 112, the security management facility 92, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 9, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management 112 may require a configuration that turns off USB drive access via a registry key of a compute instance. Aspects of configuration management may be provided, for example, in the security agent of an endpoint 9, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 112 may also require update management (e.g., as provided by the update facility 90). Update management for the security facility 92 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security facility 92 and policy management facility 112 may push information to the enterprise facility 102 network and/or the compute instances 10-26, the enterprise facility 102 network and/or compute instances 10-26 may pull information from the security facility 92 and policy management facility 112, or there may be a combination of pushing and pulling of information. For example, the enterprise facility 102 network and/or compute instances 10-26 may pull update information from the security facility 92 and policy management facility 112 via the update facility 90, an update request may be based on a time period, by a certain time, by a date, on demand, or the like. In another example, the security facility 92 and policy management facility 112 may push the information to the enterprise facility's 102 network and/or compute instances 10-26 by providing notification that there are updates available for download and/or transmitting the information. In an embodiment, the policy management facility 112 and the security facility 92 may work in concert with the update management facility 90 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 90, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 92 may scan an outgoing file and verify that the outgoing file is permitted to be transmitted according to policies. By checking outgoing files, the security management facility 92 may be able discover threats that were not detected on one of the compute instances 10-26, or policy violation, such transmittal of information that should not be communicated unencrypted.

The threat management facility 100 may control access to the enterprise facility 102 networks. A network access facility 94 may restrict access to certain applications, networks, files, printers, servers, databases, and so on. In addition, the network access facility 94 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 94 may determine if a given compute instance 10-22 should be granted access to a requested network location, e.g., inside or outside of the enterprise facility 102. Network access facility 94 may determine if a compute instance 22, 26 such as a device outside the enterprise facility 102 may access the enterprise facility 102. For example, in some cases, the policies may require that when certain policy violations are detected, certain network access is denied. The network access facility 94 may communicate remedial actions that are necessary or helpful to bring a device back into compliance with policy as described below with respect to the remedial action facility 98. Aspects of the network access facility 94 may be provided, for example, in the security agent of the endpoint 9, in a wireless access point 11, in a firewall 10, as part of application protection 150 provided by the cloud, and so on.

In an embodiment, the network access facility 94 may have access to policies that include one or more of a block list, a blacklist, an allowed list, a whitelist, an unacceptable network site database, an acceptable network site database, a network site reputation database, or the like of network access locations that may or may not be accessed by the client facility. Additionally, the network access facility 94 may use rule evaluation to parse network access requests and apply policies. The network access rule facility 94 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An exemplary event may be communication of a specific packet over the network. Another exemplary event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility Observations or inferences about events may also be logged by the event logging facility 166.

When a threat or other policy violation is detected by the security management facility 92, the remedial action facility 98 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 92 may take any steps or deploy any measures suitable for addressing a detection of a threat, potential threat, policy violation or other event, code or activity that might compromise security of a computing instance 10-26 or the enterprise facility 102.

Figure 2:
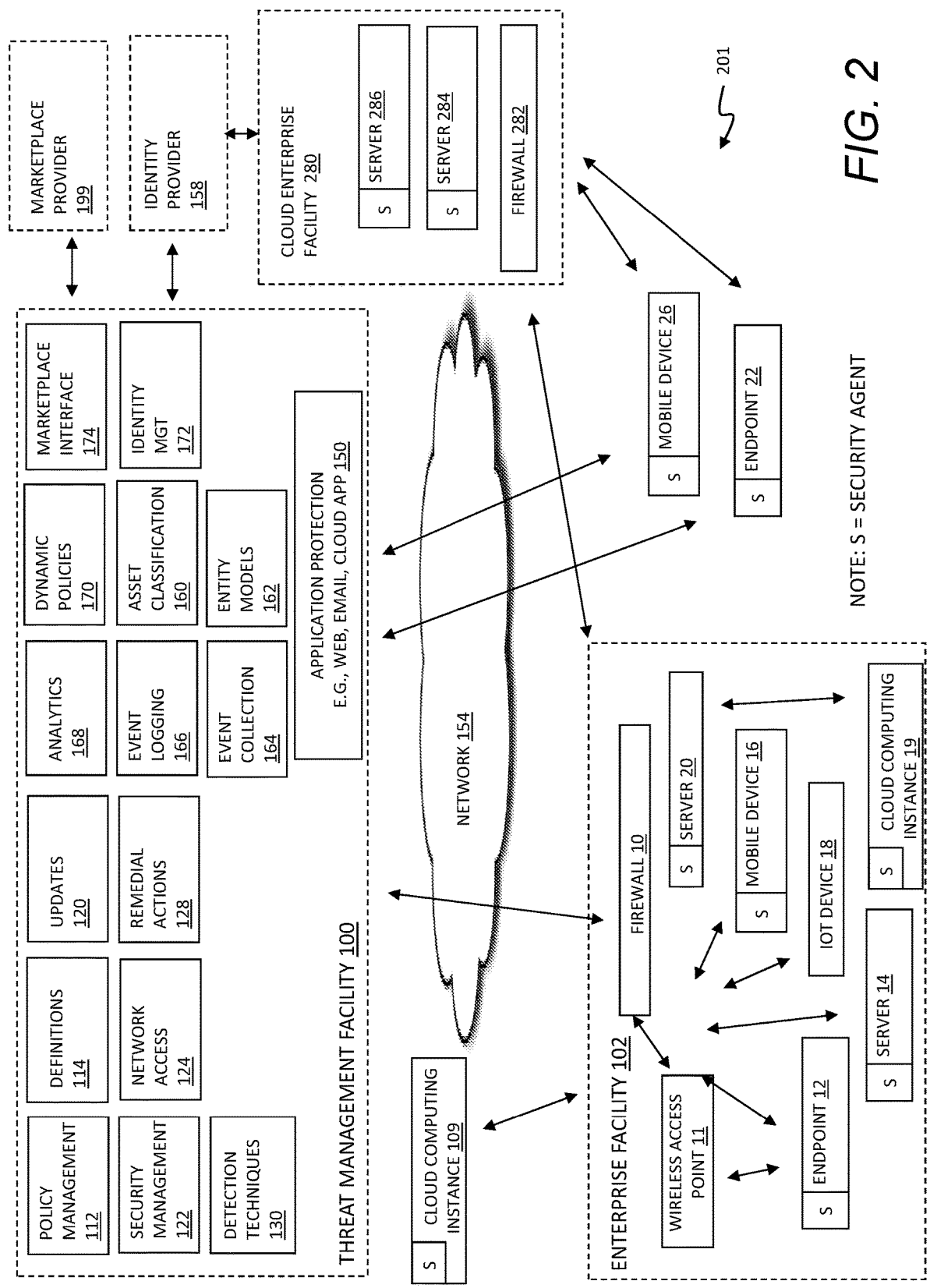
FIG. 2 depicts a block diagram of a threat management system.

FIG. 2 depicts a block diagram of a threat management system 201 such as any of the threat management systems described herein, and including a cloud enterprise facility 280. The cloud enterprise facility 280 may include servers 284, 286, and a firewall 282. The servers 284, 286 on the cloud enterprise facility 280 may run one or more enterprise applications and make them available to the enterprise facilities 102 compute instances 10-26. It should be understood that there may be any number of servers 284, 286 and firewalls 282, as well as other compute instances in a given cloud enterprise facility 280. It also should be understood that a given enterprise facility may use both SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

Figure 3:
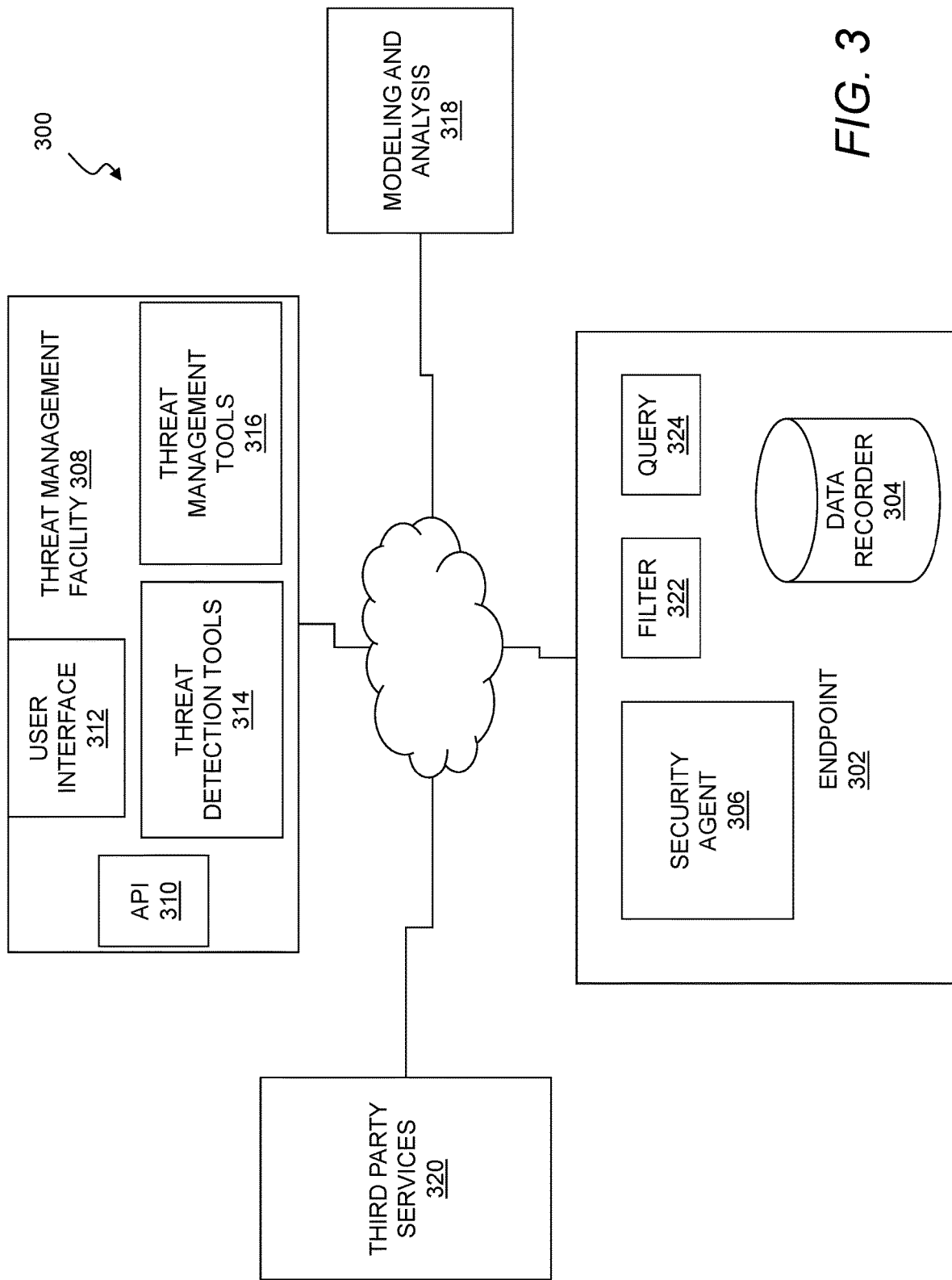
FIG. 3 shows a system for enterprise network threat detection.

FIG. 3 shows a system 300 for enterprise network threat detection. The system 300 may use any of the various tools and techniques for threat management contemplated herein. In the system, a number of endpoints such as the endpoint 302 may log events in a data recorder 304. A local agent on the endpoint 302 such as the security agent 306 may filter this data and feeds a filtered data stream to a threat management facility 308 such as a central threat management facility or any of the other threat management facilities described herein. The threat management facility 308 can locally or globally tune filtering by local agents based on the current data stream and can query local event data recorders for additional information where necessary or helpful in threat detection or forensic analysis. The threat management facility 308 may also or instead store and deploys a number of security tools such as a web-based user interface that is supported by machine learning models to aid in the identification and assessment of potential threats by a human user. This may, for example, include machine learning analysis of new code samples, models to provide human-readable context for evaluating potential threats, and any of the other tools or techniques described herein. More generally, the threat management facility 308 may provide any of a variety of threat management tools 316 to aid in the detection, evaluation, and remediation of threats or potential threats.

The threat management facility 308 may perform a range of threat management functions such as any of those described herein. The threat management facility 308 may generally include an application programming interface 310 to third party services 320, a user interface 312 for access to threat management and network administration functions, and a number of threat detection tools 314.

In general, the application programming interface 310 may support programmatic connections with third party services 320. The application programming interface 310 may, for example, connect to Active Directory or other customer information about files, data storage, identities and user profiles, roles, access privileges and so forth. More generally the application programming interface 310 may provide a programmatic interface for customer or other third party context, information, administration and security tools, and so forth. The application programming interface 310 may also or instead provide a programmatic interface for hosted applications, identity provider integration tools or services, and so forth.

The user interface 312 may include a website or other graphical interface or the like, and may generally provide an interface for user interaction with the threat management facility 308, e.g., for threat detection, network administration, audit, configuration and so forth. This user interface 312 may generally facilitate human curation of intermediate threats as contemplated herein, e.g., by presenting intermediate threats along with other supplemental information, and providing controls for user to dispose of such intermediate threats as desired, e.g., by permitting execution or access, by denying execution or access, or by engaging in remedial measures such as sandboxing, quarantining, vaccinating, and so forth.

The threat detection tools 314 may be any of the threat detection tools, algorithms, techniques or the like described herein, or any other tools or the like useful for detecting threats or potential threats within an enterprise network. This may, for example, include signature based tools, behavioral tools, machine learning models, and so forth. In general, the threat detection tools 314 may use event data provided by endpoints within the enterprise network, as well as any other available context such as network activity, heartbeats, and so forth to detect malicious software or potentially unsafe conditions for a network or endpoints connected to the network. In one aspect, the threat detection tools 314 may usefully integrate event data from a number of endpoints (including, e.g., network components such as gateways, routers, and firewalls) for improved threat detection in the context of complex or distributed threats. The threat detection tools 314 may also or instead include tools for reporting to a separate modeling and analysis platform 318, e.g., to support further investigation of security issues, creation or refinement of threat detection models or algorithms, review and analysis of security breaches, and so forth.

The threat management tools 316 may generally be used to manage or remediate threats to the enterprise network that have been identified with the threat detection tools 314 or otherwise. Threat management tools 316 may, for example, include tools for sandboxing, quarantining, removing, or otherwise remediating or managing malicious code or malicious activity, e.g., using any of the techniques described herein.

The endpoint 302 may be any of the endpoints or other compute instances or the like described herein. This may, for example, include end-user computing devices, mobile devices, firewalls, gateways, servers, routers and any other computing devices or instances that might connect to an enterprise network. As described above, the endpoint 302 may generally include a security agent 306 that locally supports threat management on the endpoint 302, such as by monitoring for malicious activity, managing security components on the endpoint 302, maintaining policy compliance, and communicating with the threat management facility 308 to support integrated security protection as contemplated herein. The security agent 306 may, for example, coordinate instrumentation of the endpoint 302 to detect various event types involving various computing objects on the endpoint 302, and supervise logging of events in a data recorder 304. The security agent 306 may also or instead scan computing objects such as electronic communications or files, monitor behavior of computing objects such as executables, and so forth. The security agent 306 may, for example, apply signature-based or behavioral threat detection techniques, machine learning models (e.g., models developed by the modeling and analysis platform), or any other tools or the like suitable for detecting malware or potential malware on the endpoint 302.

The data recorder 304 may log events occurring on or related to the endpoint. This may, for example, include events associated with computing objects on the endpoint 302 such as file manipulations, software installations, and so forth. This may also or instead include activities directed from the endpoint 302, such as requests for content from Uniform Resource Locators or other network activity involving remote resources. The data recorder 304 may record data at any frequency and any level of granularity consistent with proper operation of the endpoint 302 in an intended or desired manner.

The endpoint 302 may include a filter 322 to manage a flow of information from the data recorder 304 to a remote resource such as the threat detection tools 314 of the threat management facility 308. In this manner, a detailed log of events may be maintained locally on each endpoint, while network resources can be conserved for reporting of a filtered event stream that contains information believed to be most relevant to threat detection. The filter 322 may also or instead be configured to report causal information that causally relates collections of events to one another. In general, the filter 322 may be configurable so that, for example, the threat management facility 308 can increase or decrease the level of reporting based on a current security status of the endpoint, a group of endpoints, the enterprise network, and the like. The level of reporting may also or instead be based on currently available network and computing resources, or any other appropriate context.

In another aspect, the endpoint 302 may include a query interface 324 so that remote resources such as the threat management facility 308 can query the data recorder 304 remotely for additional information. This may include a request for specific events, activity for specific computing objects, or events over a specific time frame, or some combination of these. Thus, for example, the threat management facility 308 may request all changes to the registry of system information for the past forty eight hours, all files opened by system processes in the past day, all network connections or network communications within the past hour, or any other parametrized request for activities monitored by the data recorder 304. In another aspect, the entire data log, or the entire log over some predetermined window of time, may be request for further analysis at a remote resource.

It will be appreciated that communications among third party services 320, a threat management facility 308, and one or more endpoints such as the endpoint 302 may be facilitated by using consistent naming conventions across products and machines. For example, the system 300 may usefully implement globally unique device identifiers, user identifiers, application identifiers, data identifiers, Uniform Resource Locators, network flows, and files. The system may also or instead use tuples to uniquely identify communications or network connections based on, e.g., source and destination addresses and so forth.

According to the foregoing, a system disclosed herein includes an enterprise network, and endpoint coupled to the enterprise network, and a threat management facility coupled in a communicating relationship with the endpoint and a plurality of other endpoints through the enterprise network. The endpoint may have a data recorder that stores an event stream of event data for computing objects, a filter for creating a filtered event stream with a subset of event data from the event stream, and a query interface for receiving queries to the data recorder from a remote resource, the endpoint further including a local security agent configured to detect malware on the endpoint based on event data stored by the data recorder, and further configured to communicate the filtered event stream over the enterprise network. The threat management facility may be configured to receive the filtered event stream from the endpoint, detect malware on the endpoint based on the filtered event stream, and remediate the endpoint when malware is detected, the threat management facility further configured to modify security functions within the enterprise network based on a security state of the endpoint.

The threat management facility may be configured to adjust reporting of event data through the filter in response to a change in the filtered event stream received from the endpoint. The threat management facility may be configured to adjust reporting of event data through the filter when the filtered event stream indicates a compromised security state of the endpoint. The threat management facility may be configured to adjust reporting of event data from one or more other endpoints in response to a change in the filtered event stream received from the endpoint. The threat management facility may be configured to adjust reporting of event data through the filter when the filtered event stream indicates a compromised security state of the endpoint. The threat management facility may be configured to request additional data from the data recorder when the filtered event stream indicates a compromised security state of the endpoint. The threat management facility may be configured to request additional data from the data recorder when a security agent of the endpoint reports a security compromise independently from the filtered event stream. The threat management facility may be configured to adjust handling of network traffic at a gateway to the enterprise network in response to a predetermined change in the filtered event stream. The threat management facility may include a machine learning model for identifying potentially malicious activity on the endpoint based on the filtered event stream. The threat management facility may be configured to detect potentially malicious activity based on a plurality of filtered event streams from a plurality of endpoints. The threat management facility may be configured to detect malware on the endpoint based on the filtered event stream and additional context for the endpoint.

The data recorder may record one or more events from a kernel driver. The data recorder may record at least one change to a registry of system settings for the endpoint. The endpoints may include a server, a firewall for the enterprise network, a gateway for the enterprise network, or any combination of these. The endpoint may be coupled to the enterprise network through a virtual private network or a wireless network. The endpoint may be configured to periodically transmit a snapshot of aggregated, unfiltered data from the data recorder to the threat management facility for remote storage. The data recorder may be configured to delete records in the data recorder corresponding to the snapshot in order to free memory on the endpoint for additional recording.

Figure 4:
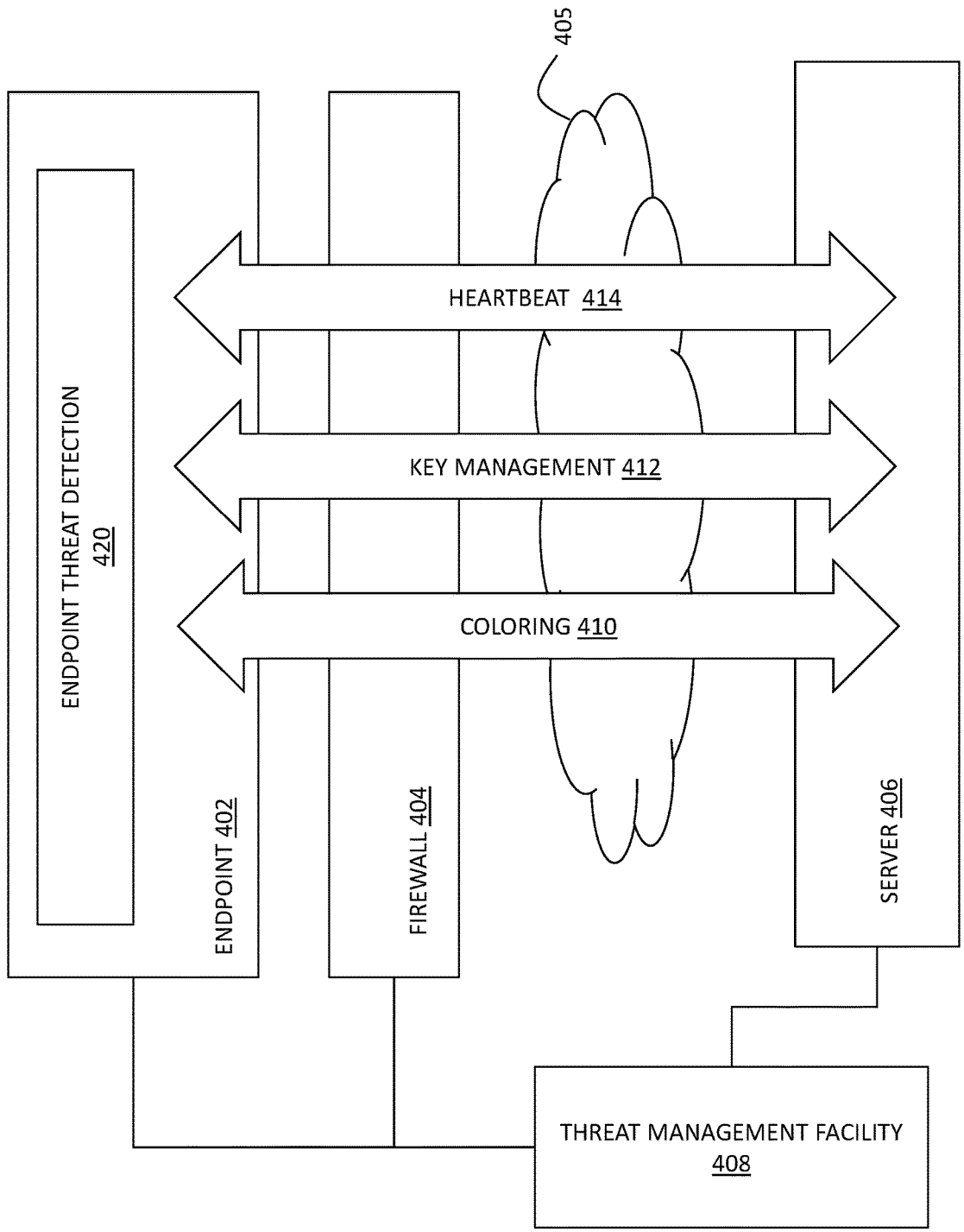
FIG. 4 illustrates a threat management system.

FIG. 4 illustrates a threat management system. In general, the system may include an endpoint 402, a firewall 404, a server 406 and a threat management facility 408 coupled to one another directly or indirectly through a data network 405, all as generally described above. Each of the entities depicted in FIG. 4 may, for example, be implemented on one or more computing devices such as the computing device described herein. A number of systems may be distributed across these various components to support threat detection, such as a coloring system 410, a key management system 412 and a heartbeat system 414, each of which may include software components executing on any of the foregoing system components, and each of which may communicate with the threat management facility 408 and an endpoint threat detection agent 420 executing on the endpoint 402 to support improved threat detection and remediation.

The coloring system 410 may be used to label or color software objects for improved tracking and detection of potentially harmful activity. The coloring system 410 may, for example, label files, executables, processes, network communications, data sources and so forth with any suitable information. A variety of techniques may be used to select static and/or dynamic labels for any of these various software objects, and to manage the mechanics of applying and propagating coloring information as appropriate. For example, a process may inherit a color from an application that launches the process. Similarly, a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 410 as contemplated herein.

The key management system 412 may support management of keys for the endpoint 402 in order to selectively permit or prevent access to content on the endpoint 402 on a file-specific basis, a process-specific basis, an application-specific basis, a user-specific basis, or any other suitable basis in order to prevent data leakage, and in order to support more fine-grained and immediate control over access to content on the endpoint 402 when a security compromise is detected. Thus, for example, if a particular process executing on the endpoint is compromised, or potentially compromised or otherwise under suspicion, keys to that process may be revoked in order to prevent, e.g., data leakage or other malicious activity.

The heartbeat system 414 may be used to provide periodic or aperiodic information from the endpoint 402 or other system components about system health, security, status, and so forth. A heartbeat may be encrypted or plaintext, or some combination of these, and may be communicated unidirectionally (e.g., from the endpoint 408 to the threat management facility 408) or bidirectionally (e.g., between the endpoint 402 and the server 406, or any other pair of system components) on any useful schedule.

In general, these various monitoring and management systems may cooperate to provide improved threat detection and response. For example, the coloring system 410 may be used to evaluate when a particular process is potentially opening inappropriate files based on an inconsistency or mismatch in colors, and a potential threat may be confirmed based on an interrupted heartbeat from the heartbeat system 414. The key management system 412 may then be deployed to revoke keys to the process so that no further files can be opened, deleted, or otherwise modified. More generally, the cooperation of these systems enables a wide variety of reactive measures that can improve detection and remediation of potential threats to an endpoint.

Figure 5:
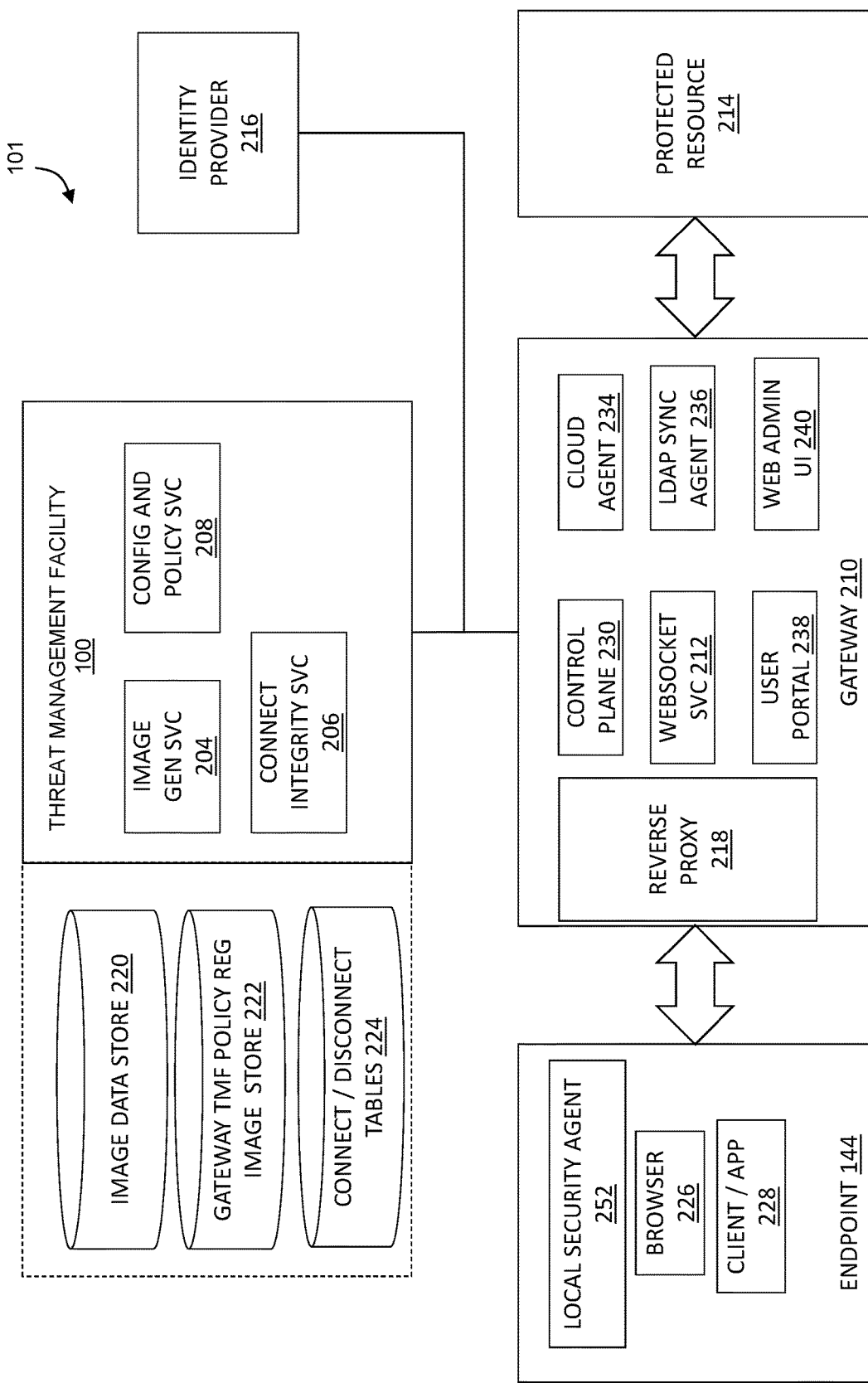
FIG. 5 shows a threat management facility in a zero trust network access environment.

FIG. 5 shows a threat management facility in a zero trust network access environment. In a zero trust network access environment for a system 101 such as an enterprise network, an endpoint 144 may be separated from a protected resource 214 such as an application or data store by a gateway 210. In general, the gateway manages access to the protected resource 214, and the threat management facility 100 provides security services for the enterprise network as generally described herein.

In embodiments, a threat management facility 100 such as any of those described herein may be adapted, may be integrated with, or may operate as a component of a system/service that provides central control of security and operational features of a ZTNA deployment. Thus, a threat management facility 100 may include a ZTNA-enabled threat management facility that manages endpoints and resources within a ZTNA environment. As described herein, this may include management of services such as an image generation service 204 for facilitating instantiation, registration, and/or configuration of a new ZTNA gateway for providing secure access to a protected resource 214, such as an enterprise software application, service, database, and the like. The threat management facility 100 may, for example, include a configuration and policy service 208 that facilitates establishing system resource configuration and security policies for the enterprise network. Other services may include a connection integrity service 206 for monitoring and optionally ensuring integrity of WebSocket-type connections in a range of deployments, including deployments in which WebSocket-type connections are routinely refreshed.

The threat management facility 100 may communicate with other elements of a ZTNA threat management architecture through a network, such as an enterprise network, the Internet or the like. In one aspect, the threat management facility 100 may instantiate a gateway 210 using the image generation service 204 and provide polices and the like to manage operation of the gateway 210 consistent with polices for the enterprise network. The gateway 210, or portions thereof, may be instantiated for providing secure access to a protected resource 214.

The gateway 210, as instantiated, may provide secure connectivity for client devices, such as an endpoint 144, to a protected resource 214 via, for example a WebSocket service 212 and a client access port, such as a reverse proxy 218. The gateway 210 may facilitate establishing and maintaining the connection with an endpoint-deployed local security agent 252 adapted for operation in a ZTNA environment. Services operating on the gateway 210 may participate in enterprise threat management in addition to providing user/endpoint access to protected resources. In general, a ZTNA environment relies on authentication of endpoints 144 on a resource-by-resource basis. To this end, the system 101 may include an identity provider 216 that supports, e.g., secure, credential-based authentication of entities within the zero trust network environment.

The threat management facility 100 may include one or more of an image generation service 204, a configuration and policy service 208, or a connection integrity service 206. Each of these services are described further herein. Each of these services, individually or in any combination, may be provided by a computing system of the threat management facility 100, which may be physically hosted by an enterprise, hosted in a cloud-based computing environment, or some combination of these, and may be available to administrators and other users through a web server interface or the like. In one aspect, services used by the threat management facility 100 may also be deployed as protected resources within the zero trust network environment, e.g., as applications served in a cloud-based environment within a ZTNA architecture. These services may perform one or more functions that are described below while taking advantage of the security benefits of both a zero trust network environment and a threat management facility 100. As an example, a connection integrity service 206 may rely on the configuration and policy service 208 for connection integrity conditions and remediation actions (e.g., connection time-out limits and the like).

The threat management facility 100 may further be constructed with and/or provide access to various data storage facilities, such as a gateway image data store 220 of gateway instantiation/update data structures. A gateway registration storage facility 222 (or optionally an extension of the image data store 220) may store gateway-specific configuration and/or registration images or portions thereof that may be used by an instantiated gateway 210 for threat management configuration, registration as a ZTNA gateway, and the like. Exemplary threat management functions that may be imposed on a gateway through use of an image from the gateway registration storage facility 222 may include automatic loading of preconfigured threat management policies and registration of the gateway 210 with the threat management facility 100 as a component of an enterprise network management platform. As an example, a mountable image in the gateway registration storage facility 222 may be accessed by a newly instantiated gateway 210. This registration storage facility 222 may also be used to store mountable image templates, gateway registration/configuration setup scripts, rules (e.g., registration rules, gateway mountable image generation rules and the like) as well as prior revisions of gateway instantiation-specific configurations and the like that may be used by, for example, the image generation service 204. In embodiments, the image generation service 204 may include or have access to a user interface (not depicted) through which gateway images may be specified, configured, maintained, accessed, and managed by a user, such as an administrator and the like. Optionally, the image generation service 204 may provide access to user interface screens, templates, workflows, and the like for use by a user interface of the threat management facility 100 for gateway image specification, maintenance, and the like.

In one aspect, the threat management facility 100 may include and/or provide access to data structures for managing connection integrity, such as the connection data storage facility 224. This facility 224 may include one or more lists/tables of connections between users/endpoints 144 and protected resources 214. The connection data storage facility 224 may also or instead include one or more of lists/tables of disconnections. In embodiments, the connection integrity service 206 may maintain the data in this storage facility 224 (e.g., the exemplary connection and disconnection lists) for managing and/or monitoring the integrity of connections between end users and protected resources. In an example, data representative of a connection established through a WebSocket service of the ZTNA architecture may be stored in the connection data storage facility 224 as one or more entries in a connection and/or disconnection list. Other types of data that may be stored in the connection data storage facility 224 may include connection histories, connection integrity rules, policies, algorithms, and the like.

In embodiments, the connection integrity service 206 may interface with the connection integrity data storage facility 224. While depicted in FIG. 5 as elements of the threat management facility 100, either or both connection integrity elements may be provided through one or more services or network resources that are external to the threat management facility 100. As an example, the connection integrity service 206 may be a first protected resource and the connection integrity data storage facility 224 may be a second protected resource of a ZTNA architecture. Further, it is contemplated that various combinations of integrated and external elements of the threat management facility 100 can be embodied, such as an integrated connection integrity service 206 and a remotely accessible connection integrity data storage facility 224.

Further embodiments of the connection integrity data storage facility 224, the connection integrity service 206 and uses thereof are described elsewhere herein.

Regarding the image generation service 204, before a gateway can be registered for providing secure connection services and/or threat management services, the gateway must be configured and instantiated. In a high-level example of gateway configuration, an administrator may interface with the threat management facility 100 and enter/select details of the gateway. These details may include, without limitation a gateway name, a Fully Qualified Domain Name (FQDN), certificates, a One Time Password (OTP), identity providers to use for authentication, and the like. Depending on the deployment platform (e.g., VMWare, HyperV, AWS, Azure, GCP, and the like), the image generation service 204 may be configured to generate a deployment-formatted image. Example image formats include: OVF format for VMware or Hyper V; Terraform template to AWS, Azure or GCP; and the like. The administrator can direct delivery of a configured image to the corresponding deployment platform for installing an instance of the gateway. Details of gateway configuration, image generation, instantiation, mountable image generation, automated registration, and the like, along with additional features, embodiments, and uses of the image generation service 204 and the connection integrity service 206 are described for exemplary embodiments elsewhere herein.

The threat management facility 100 may also provide a range of administrative services including configuring gateways, managing protected resources, configuring identity providers, monitoring ZTNA appliances, notifications, reporting (e.g., user, application, device), user management and the like. These and other administrative services may be performed and/or managed through one or more user interfaces provided by threat management facility 100. An exemplary service is a configuration and policy service 208. Major architecture elements that a configuration and policy service may handle for a ZTNA solution include identity providers 216, gateways 210, policy objects, and application definitions and policies. In embodiments, configuration of identity providers may be based on enterprise policies. While use of a single identity provider 216 is supported by the methods and systems herein, using multiple identity providers, such as for partners, contractors, different parts of an enterprise and the like is also supported. A configuration and policy service 208 may handle multiple identity provider configurations. In an example where support for multiple identity providers may be beneficial, an enterprise may have acquired another enterprise that uses a different identity provider. In another example the acquired enterprise may use the same provider, but may have different configurations and policies for the identify provider.

A configuration and policy service 208 may facilitate adding a gateway by providing data structures that define application-to-frontend security, threat management policy, and related configuration details (e.g., default parameter values, static parameters, and the like). A configuration and policy service 208 may utilize policy objects, such as reusable objects in application policy rules. Exemplary policy objects include at least two types of policy objects; lists and expressions. In embodiments, lists can be used to store sequences of values, whereas expressions can store more complicated sequences of conditions to be evaluated. Other aspects of configuration and policy may include application details of the protected resource, such as FQDN and/or IP address, port numbers, protocols, and an identifier of a gateway through which the application is to be accessed. As an example, application policy may include details of constraints under which access to an application (e.g., protected resource 214) is allowed/denied. These constraints could be based on several variables associated with an attempt at accessing the protected resource including identity of a user attempting the access, groups that the user belongs to, device type or OS through which the user is making the access attempt, device posture information including security/health status, and the like.

In embodiments, a gateway 210 may be adapted with features that provide support for managing threat management for an enterprise system deployed within a ZTNA architecture. As the data plane element in ZTNA solutions, the gateway 210 handles traffic destined for protected resources 214 while facilitating user authentication for connecting to the resource (typically an application) as well as applying policies for authorizing such requests. The gateway 210 may also be adapted for operation in a managed enterprise network environment that provides centralized threat management. In embodiments, the gateway 210 may receive configuration, policy, threat management, and enterprise network management data from a control plane element, such as threat management facility 100.

The gateway 210 may be configured with a reverse proxy 218, a WebSocket service 212, a control plane interface 230, a cloud agent 234, a LDAP sync agent 236, an update agent 240, a user portal 238, a web admin user interface 240, and other features.

In embodiments, a reverse proxy 218 is the primary point of entry into the gateway 210 for traffic that accesses and/or interacts with the protected resource 214. The reverse proxy 218 provides, among other things, virtual host definitions for the protected resource 214 while acting as a proxy for traffic destined for the protected resource/application 214. In embodiments, a reverse proxy can provide a secure HTTPS connection terminus for applications, such as applications that support only HTTP. The reverse proxy 218 may further coordinate with authentication and authorization services to facilitate authenticating users as well as verifying if a request for access is allowed based on access and/or security policies associated with the protected resource 214.

In embodiments, a WebSocket service 212 may provide support for, among other things, TCP/UDP/ICMP traffic applications (like SSH, RDP, SNMP, Ping etc.). The WebSocket service 212 may also support browser-based application access to protected resources 214. An agent-based interaction with an agent operating on an endpoint may be provided from the gateway 210. In agent-based cases, the endpoint agent, such as a local security agent 252 on the endpoint 144 may establish a tunnel interface with the WebSocket service 212 of the gateway 210 so that traffic for the protected resource 214 can be sent over an encrypted WebSocket channel. In an example, on the gateway, the reverse proxy 218 may allow the WebSocket traffic to flow to the WebSocket server 212 if the user has been authenticated. The WebSocket server 212 may apply further authorization checks to see if the user is permitted access to the protected resource 214.

Other gateway 210 services and elements may include an LDAP sync agent 236 that ensures that identity information is maintained throughout the architecture for use by hosted identity services, such as Active Directory or LDAP, and the like. In embodiments, the LDAP sync agent 236 may periodically fetch relevant identity information so that all relevant instantiated elements (e.g., the control plane and the like) can have the changes that were made since the previous sync.

In embodiments, a cloud agent module 234 may be responsible for getting the latest configuration from the administrative entity, such as threat management facility 100 as well as sending logging, reporting, and monitoring data. Upon receiving configuration data, the cloud agent module 234 may store configuration data and send notifications for all interested modules to reload the stored configuration data. The cloud agent module 234 may also be responsible for translating policy definitions to various query languages, such as to a Rego policy language.

The gateway 210 may be configured with a control plane service 230. Whenever a new protected resource 214 is added by the administrator or, for example, the security material (e.g., certificate and/or private key data) for the gateway 210 is changed, the gateway 210 would need to reload the configuration. Similarly, changes in application policy would require a reload of policy data. The control plane service 230 supports refreshing configuration and policy for a gateway 210 through an external service, such as an Application Programming Interface (API). A refresh may be based on a scheduled poll for changes, or any other periodic or other scheduled or ad hoc basis. The control plane service 230 may support refresh including a poll-based refresh. In embodiments, the control plan service 230 may facilitate interfacing with a ZTNA central controller, such as threat management facility 100 as described herein by implementing interfaces such as remote procedure call (e.g., gRPC), representational state transfer (e.g., REST) and the like.

Another gateway element is a user portal 238. In embodiments, the user portal is a web-based console where an authenticated user can browse accessible protected resources 214 as well as access them using bookmarks. The user portal module 238 may include user interface assets to render, for example user portal web pages as well as support backend functionality to provide access to the protected resources 214.

Yet another of the gateway elements in a ZTNA architecture adapted to support enterprise network threat management is a web administrator user interface 240. In embodiments, an administration user interface 240 may expose important metrics related to the gateway 210 as well as troubleshooting interfaces useful to an administrator or the like for investigating network usage, error messages, log files, and the like. The user interface 240 may be exposed through a web server, such as one that serves HTML/JS/CSS resources.

Protected resources 214 may be accessed through an endpoint, such as the endpoint 144 described herein. A local security agent 152 that may be deployed on an endpoint is also described herein. When configured for providing threat management in a ZTNA architecture, the local security agent 152 may be adapted to communicate with a corresponding gateway 210. In addition to threat and network management functions of a local security agent 152 that are described elsewhere herein, a ZTNA adapted local security agent 252 may communicate device posture (e.g., security and threat-related status of the endpoint, and the like) continuously with the gateway 210. This posture may be used for compliance with authorization policies of the enterprise network and/or the zero trust network environment.

For legacy endpoint-executed applications 228 that may be accessing protected resources 214, such as data structures and the like, the ZTNA adapted local security agent 252 may handle both ZTNA compliance and on-endpoint application interfacing. As an example, such an agent may intercept application network-bound traffic of the application 228 and coordinate transfer of that traffic over a secure channel that it established between the endpoint 144 and the gateway 210 rather than allowing the network-bound traffic to be delivered directly over the network from the application 228. Return traffic from the protected resource 214 may be communicated over the established secure channel to the agent 252 where it is converted to application-specific form and delivered to the application 228 executing on the endpoint 144.

Basic forms of a ZTNA architecture can be operated without an endpoint agent, such as for web browser-based applications (e.g., web server executed applications and the like that interface with the endpoint through the browser 226) because a secure channel can be established between a web browser 226 and the gateway 210 using SSL and other types of secure tunneling. However, lack of a local agent, such as an adapted local security agent 252, may limit the extent of threat management that can be performed on the endpoint 144 in a ZTNA architecture. Therefore, a ZTNA adapted local security agent 252 may be configured to provide threat and network management services (e.g., comparable to those of a local security agent 152) for the endpoint independent of the type of client software being used on the endpoint. In embodiments, the endpoint 144 may be adapted, such as through execution of a local security agent 252 that is adapted for use in zero trust environments to monitor and/or ensure enterprise threat management for both agentless (e.g., web browser like) and agent-based (e.g., native app-based) access to protected resources 214.

Figure 6:
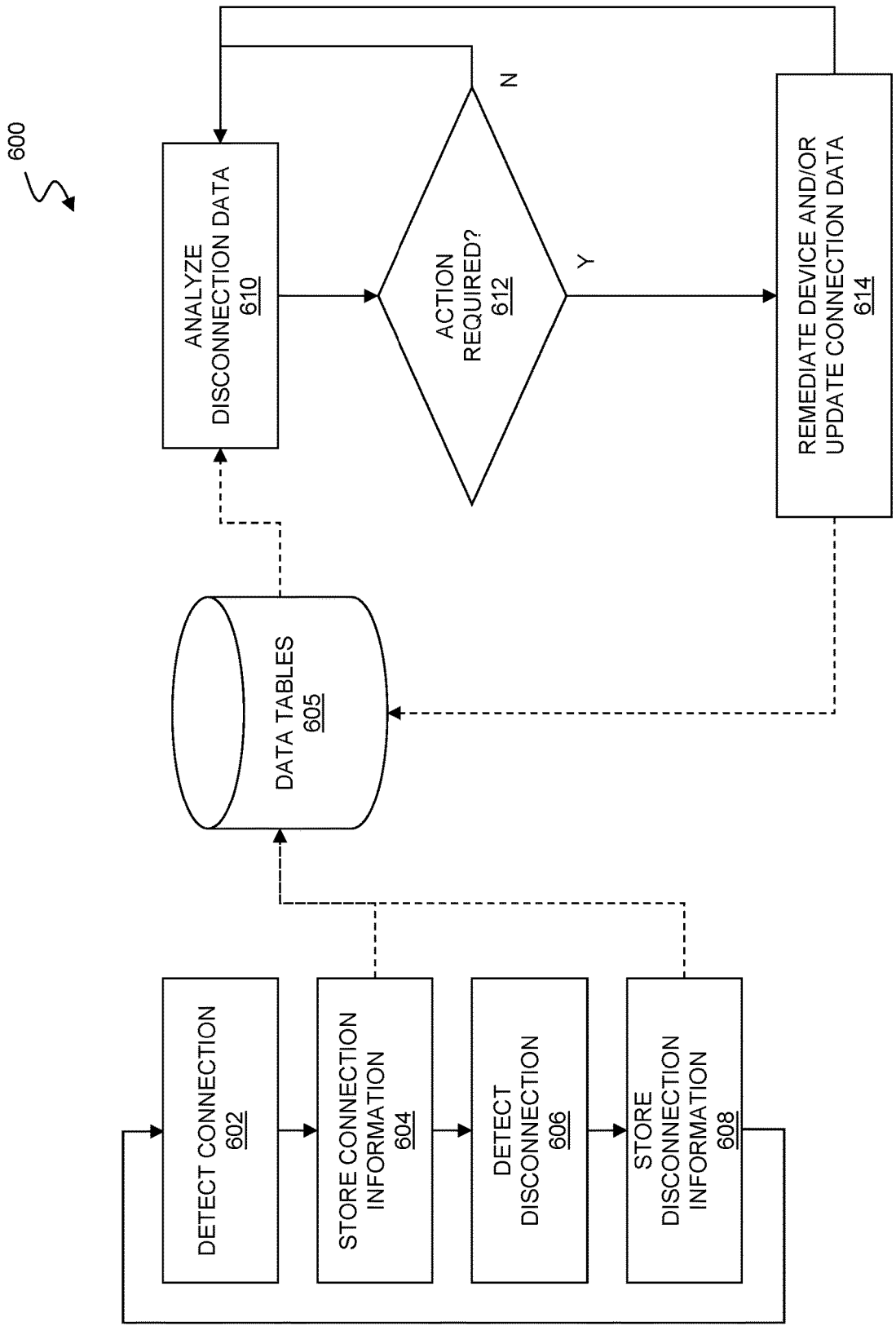
FIG. 6 shows a method for cloud management of connectivity for edge networking devices.

FIG. 6 shows a method for cloud management of connectivity for edge networking devices. In general, certain edge networking devices such as application gateways may report status to a cloud-based threat management platform using a persistent network connection between the gateway and the cloud platform. The threat management platform may utilize such a persistent network connection to facilitate threat policy configuration, enforcement, and remediation. Therefore, awareness of connection status and behaviors may impact how a threat management platform operates. Where a cloud computing platform for an edge networking device or the treat management platform imposes periodic timeouts, the threat management platform may monitor connects and disconnects for edge devices and asynchronously evaluate connection status of edge devices independently of a heartbeat or other signal through the persistent connection in order to distinguish connection timeouts imposed by, for example, the cloud computing platform from networking devices that are compromised or malfunctioning.

As shown in step 602, the method 600 may include detecting a connection of an edge networking device to a security resource hosted on a cloud computing platform such as a cloud-based threat management facility for an enterprise network. For example, this may include detecting a connection to a threat management facility for an enterprise network by an application gateway for one or more applications associated with the enterprise network, or a connection with the threat management facility by any other edge networking device or other managed device such as a firewall or the like managed by the threat management facility according to security policies for the enterprise network. In embodiments, detecting a connection and/or disconnection may be based on notifications exchanged among the devices and platforms participating in persistent connections. In one aspect, the notifications of each connection (and disconnection, below) may be provided through an application programming interface (API) or other signaling medium for a cloud computing platform that hosts the threat management facility for the enterprise network, or any other suitable host platform mechanism or the like. In another aspect, the edge networking device may be hosted on a second cloud computing platform independent from the cloud computing platform hosting the threat management facility, such that the threat management facility receives notifications about connections through an API for the second cloud computing platform. In embodiments, a persistent connection as described herein may include a WebSocket connection. Further a persistent connection may be established between a threat management facility and a zero trust network access (ZTNA) gateway using, for example a WebSocket connection.

As shown in step 604, the method 600 may include, e.g., in response to detecting a connection, storing connection information for the connection of the edge networking device in a memory associated with the threat management facility, such as a data tables 605 in a database or other data store for the threat management facility. The connection information may include any information useful for distinguishing expected disconnections (e.g., those due to expected timeouts) from unexpected disconnections or timeout) as described herein. For example, the connection information may include a name or other identifier for the connected device, an identifier of a cloud computing platform hosting the connected device, and a time stamp for a time of creation of the connection as assigned by the cloud computing platform in an event notification or other notification, message, or the like generated when the connection is created. In embodiments, the time stamp may be based on a time of receipt of the event notification, such as at the threat management facility.

As shown in step 606, the method 600 may include detecting a disconnection of the edge networking device from the threat management facility. For example, this may include detecting a disconnection of an application gateway for one or more applications associated with an enterprise network from a threat management facility for the enterprise network, or a disconnection of any other edge networking device or other managed device such as a firewall or the like managed by the threat management facility according to security policies for the enterprise network. In one aspect, the notifications of each disconnection may be provided through an application programming interface or other signaling medium for a cloud computing platform that hosts the threat management facility, or any other signaling medium or programming interface for the cloud computing platform that hosts the threat management facility.

As shown in step 608, the method 600 may include, e.g., in response to detecting the disconnection, storing disconnection information for the disconnection of the edge networking device in a memory associated with the threat management facility, such as the data tables 605 noted above, or any other local or remote data store used by the threat management facility. In general, connect information and disconnect information may be stored in separate data tables (e.g., a connect data table and a disconnect data table), or in a single data table, or in any other data structure and/or memory suitable for access by a threat management facility for the purposes described herein. In a single data table example, an entry for each connected device may include a connection time stamp field that is populated with the connection creation time and a disconnection time stamp field that may be populated with a time of disconnection. The disconnection information may include any information useful for distinguishing disconnections (e.g., those due to expected timeouts) from unexpected disconnections (e.g., independent of the source of the disconnection being due to a form of timeout) as described herein. For example, the disconnection information may include the name or other identifier for the disconnected device, along with a second time stamp for a time of the disconnection as assigned by the cloud computing platform in an event notification or other notification, message, or the like generated when the connection is created. In general detection of connections and disconnections, along with the associated storage of connection information and disconnection information, may occur any number of times for any number of different edge networking devices. Thus, while a single flow of steps is shown, steps 602 through 608 may be performed any number of times, in sequence or in parallel, as various devices connect to and disconnect from the threat management facility for purposes of centralized management.

As shown in step 610, the method 600 may include analyzing disconnection data. More generally, this may include analyzing disconnections by applying one or more rules to the connection information and disconnection information stored in the data tables 605. This analysis may be used to distinguish whether a particular disconnection identified in the data tables 605 occurred according to a connection reset rule for the cloud computing platform that hosts the edge networking device (e.g., a connection reset rule that specifies a maximum duration for a connection), or occurred for some other reason. As noted above, a cloud platform may enforce periodic timeouts on virtualized devices, e.g., to ensure that abandoned or malfunctioning devices are not retained in perpetuity, at the expense of available computing resources. The data in the data tables 605 may catalogue connections to and disconnections from a threat management facility in a manner that permits asynchronous, rule-based identification of different types of disconnects, such as disconnects that are initiated by a cloud-based host platform enforcing periodic timeouts and other types of disconnects that may require intervention or remediation.

For example, disconnections in the data table 605 may be analyzed, either periodically or on an ad hoc (e.g., user-initiated) basis by comparing the time of disconnection to a current system time. This include determining a disconnection duration for the named device. If the disconnection occurred according to a connection reset rule for the cloud computing platform or is otherwise consistent with platform-imposed reset behavior, the method 600 may include waiting for the connection to reset and returning to step 610 where additional disconnection entries can be analyzed. More specifically, if the disconnection duration is currently shorter than a reset interval for reestablishing the disconnected connection with the cloud platform (e.g., where a duration of time from when the cloud computing platform resets the connection to when it is reestablished is less than one second, the disconnection may be identified as potentially consistent with a cloud platform connection reset rule, and analysis may return to step 610 where the disconnection data in the data tables 605 is analyzed. In this context, it will be understood that the actual reset interval, and/or the corresponding permissible disconnection interval may be longer (e.g., five seconds) or shorter (e.g., 100 milliseconds) than one second, based on, e.g., the behavior or rules of the cloud platform, the need for continuous connectivity for an application or resource, and so forth. On the other hand, if the disconnection duration is greater than the reset interval, a potential problem may be flagged such that action is required in step 612 and the method 600 may proceed to step 614 where any suitable action is taken. Analyzing the disconnection data may include comparing a disconnect duration with a cloud platform-specific reset interval selected based on, for example, an identifier of a cloud platform contained in the disconnect information, or any other information about the cloud platform or other context.

A variety of additional techniques may also or instead be used to analyze timeouts/disconnects. The method 600 may include waiting for the connection to reset by determining a maximum allowable reset interval for the cloud computing platform from which the edge device has been disconnected and checking connection information in the data table 605 at a time that is proximal to the end of the maximum allowable reset interval for the connection to indicate that it has been reestablished. The method 600 may include starting a timer representative of the amount of time remaining in the reset interval and using the expiration of that timer as a trigger to analyze connection data in the data tables for a renewal of the disconnected connection occurring prior to the timer expiring. The method 600 may include, responsive to processing a disconnection entry in the data tables 605, checking for a corresponding connection entry in the data tables 605 (e.g., a connection that identifies the same edge device, cloud computing platform, and/or connection name as found in the information stored when the disconnection is detected). If such a connection entry is found, the time stamp may be compared to a time stamp for the disconnection entry being processed to determine if the connection entry occurred after the disconnection, thereby providing evidence of a reconnection, which may include a reset connection. In this case, the data table(s) 605 may be updated to consolidate these entries into a single, current connection. If a duration of time between the time in the disconnect record and the time in the corresponding subsequent connection record is less than a cloud platform-specific reset interval for the cloud platform associated with the connection, optionally with an additional reconnect duration time buffer, the disconnection may be identified as expected. However, if the duration of time between the time in the disconnect record and the time in the corresponding subsequent connection record is greater than the cloud platform-specific reset interval, or some multiple there of (e.g., 1.2 times), the disconnect may be flagged as potentially unexpected, with any suitable notifications, alerts, or automatic actions initiated in response thereto.

The data tables 605 may be adjusted based on established connections, disconnections, and relationships therebetween using the disconnect analyses described here. When, for example, a disconnect notification is matched to a subsequent connect notification that complies with a cloud platform reset interval condition or rule, the disconnect notification/entry in the data tables 605 can be deleted and a state entry for the named device can be updated in the connect table, or a new connection entry can be create in place of the existing entries for a connection. The method for cloud management of connectivity for edge networking devices may include executing a process, routine or the like that periodically updates the data tables 605 by applying the corresponding rules, for example by removing entries in the table (e.g., connect and/or disconnect entries) of named devices for which disconnect analysis indicates the duration of disconnect exceeds a disconnect threshold for a cloud platform or the like. The process may also or instead determine if a connection duration in the connection table has exceeded a connection duration reset timeout for the cloud platform with which the connection is made (or some other connection threshold based on security policy and the like) and flag the connection as unexpectedly disconnected, thereby indicating a condition of a compute instance, or the connection created by the compute instance, that requires intervention such as restarting, malware scanning, requests for manual user or administrator intervention, or other remediation or the like. In one aspect, a connection may exceed a connection duration reset timeout if the connection between a cloud-based platform and the threat management facility fails to properly reset (e.g., if the disconnect/reset notification from the cloud-based platform does not reach the threat management facility, such as due to a network failure or the like). In such a situation, the connection entry in the data table 605 may be deleted, flagged as invalid, or otherwise annotated to inform further disconnect analysis of the detected potential problem with the connection.

Other conditions may require action as indicated in step 612. For example, where a total duration of the connection, as measured based on the time stamp of a connection and the current system time, is approaching a duration of a connection timeout interval for a cloud platform (e.g., a maximum connection time after which the connection is expected to be reset by the cloud platform), the threat management facility may initiate a reset of the connection (or an explicit disconnect followed by the creation of a new connection) in step 614 before the cloud platform resets the connection. In another aspect, where a disconnection did not occur according to a connection reset rule for the cloud computing platform (e.g., based on the disconnection analysis described herein or some other disconnection indicator), action may be required as indicated in step 612, and the method may include remediating the gateway as indicated in step 614.

In general, the analysis in step 610 may be performed asynchronously from steps 602 through 608. That is, the analysis in step 610 may be performed on data currently stored in the data tables 605 (or other data store) based on any suitable schedule and independently from the detection of connections/disconnections and storage of related event data.

As shown in step 614, the method 600 may include remediating the edge networking device, such as by relaunching the edge networking device or checking the edge networking device for malware. By way of example, this may include remediating an application gateway that disconnected outside cloud computing platform reset parameters (e.g., based on the disconnect information analysis described herein) by restarting or relaunching the edge networking device or by fixing a network issue. In another aspect, this may include performing security operations on an application gateway or other device such as performing an antimalware scan, attempting to obtain a heartbeat or other security information from a local security agent on the device, retrieving data from a data recorder or other event log on the device, and so forth. As another example suggested above, the threat management facility may reset the connection prior to a maximum duration for the connection specified by the cloud computing platform. Similarly, the threat management facility may terminate an existing connection and start a new connection for the device, or terminate and relaunch the device, in order to create a new connection before the previous connection is terminated or reset by the cloud computing platform (e.g., based on the cloud computing platform connection timeout interval). In one aspect, one or more responses to a failed connection (that did not result from a cloud platform connection timeout) may be automatically initiated, e.g., by the threat management facility. In another aspect, an alert may be generated to an administrator who may, in turn, investigate and manually take corrective action as appropriate.

Step 614 may also or instead include updating data in the data tables 605 under certain conditions. For example, if a disconnection is followed by a reconnection while waiting for the connection to reset as described above, the method 600 may include removing the disconnection information from the data table, tagging the disconnection information as obsolete, archiving the disconnection information, and the like. More generally, if the disconnection is followed by a second connection of an edge networking device to the threat management facility, the method 600 may include removing the disconnection information from the data table 605 or other memory, for example based on a determination that the disconnect-connect sequence complies with a cloud platform-specific reset interval or is otherwise acceptable. Still more generally, other actions to remediate or interact with an edge networking device and/or update data in the data tables 605 may be taken consistent with the disclosure herein.

According to the foregoing, in one aspect there is disclosed herein a system including an endpoint in a zero trust network access environment, a zero trust application for the endpoint, a gateway for connecting the endpoint to access the zero trust application, an identity provider supporting authentication of the endpoint for use of the zero trust application, and a threat management facility for an enterprise network, and a threat management facility. The gateway may be hosted on a first cloud computing platform. The threat management facility may be hosted on a second cloud computing platform independent from the first cloud computing platform. The threat management facility may include a processor and memory storing computer executable instructions that configure the threat management facility to perform the steps of: detecting a connection of the gateway to the threat management facility; storing connection information for the connection of the gateway in a data store associated with the threat management facility; detecting a disconnection of the gateway; storing disconnection information for the disconnection of the gateway in the data store associated with the threat management facility; asynchronously analyzing the disconnection to determine if the disconnection occurred according to a connection reset rule for the second cloud computing platform hosting the threat management facility by applying one or more rules to the connection information and the disconnection information stored in the data store; if the disconnection occurred according to the connection reset rule for the second cloud computing platform, waiting for the connection to reset; and if the disconnection did not occur according to the connection reset rule for the cloud computing platform, remediating the edge networking device.

Figure 7:
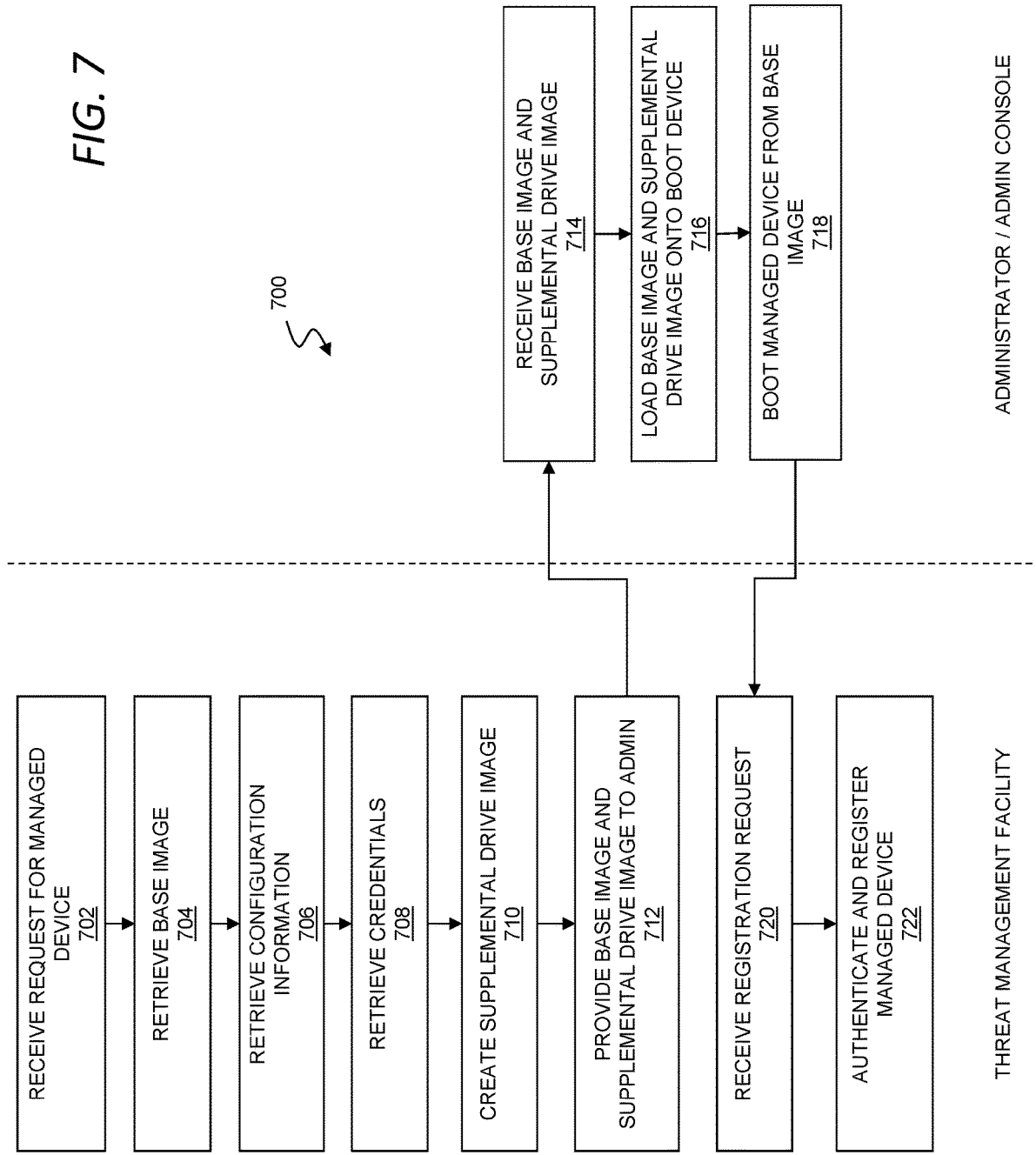
FIG. 7 shows a method for managing a gateway in a zero trust environment.

FIG. 7 shows a method for managing a gateway in a zero trust environment. A virtualized gateway for applications in a zero trust network access environment may be managed from a cloud-based threat management facility for an enterprise network. In order to facilitate creation of a new, centrally managed gateway, a one-time passcode for registration of the gateway to the threat management facility may be encoded onto a virtual disk and distributed to a host platform along with a base gateway image for the gateway. This advantageously permits the new gateway to boot and securely register with the threat management facility without further administrative intervention.

As shown in step 702, a method 700 for deploying a centrally managed gateway for zero trust network access may include receiving a request from an administrator for an enterprise network to configure a managed device for the enterprise network. The managed device may be any managed device, such as an application gateway that supports zero trust network access to one or more applications for the enterprise network or some other gateway for zero trust network applications, services, databases, and so forth. In one aspect, the managed device may be another network device for the enterprise network such as a firewall, a wireless access point, a switch, and so forth.

The request may be received, e.g., at a threat management facility that manages security for the enterprise network, such as through an administrative console or other user interface or programmatic interface for the threat management facility. The threat management facility may be hosted on the physical premises of the enterprise network, on a cloud computing platform, or some combination of these. Similarly, the managed device may be hosted on the physical premises of the enterprise network or the managed device may be a virtualized device hosted in a cloud computing platform, which may be the cloud computing platform that hosts the threat management facility or a second cloud computing environment. Thus, in one aspect, the threat management facility may be hosted on a first cloud computing platform that is different than (i.e., independently operated from) a second cloud computing platform that hosts the managed device.

As shown in step 704, the method 700 may include receiving a base image for the managed device. The base image may generally include a bootable image of the managed device configured for use with a boot device. The base image may, for example, be licensed from one or more third parties for use in the enterprise network, and may include an operating system and/or any other applications or other code to provide at least a portion of the functionality of the managed device. In one aspect, the threat management facility (or a data repository for or accessible by the threat management facility) may include a number of base images such as base images for different managed devices and, for each managed device, a base image for each physical or virtual platform on which the managed device may be deployed. Thus, for example if an enterprise uses three different cloud computing platforms from different vendors, the threat management facility may store three different corresponding versions of the base image. The base image may be received, e.g., by automatically retrieving the base image to a location accessible to the requesting administrator, or by providing a link for the administrator to access and download an instance of the base image for use in launching the managed device. In general, the boot device may be a physical device, or a virtual device, e.g., hosted by a cloud platform provider. In the latter case, the base image may be provided in any suitable virtualization format used by the cloud platform provider.

As shown in step 706, the method 700 may include retrieving configuration information for the managed device. In one aspect, this may include receiving configuration information from an administrator through an administrative console for the threat management facility. This may, for example, include a client identifier for the managed device (e.g., as a credential for a user of the managed device). Configuration information may also include information for using the managed device with the enterprise network such as local area network configuration, wide area network configuration, and domain name service information. Other configuration information useful for deploying the managed device in an enterprise network may include a name for the managed device and/or a fully qualified domain name for the managed device. Security information may also be included in the configuration information such as a certificate for the managed device and a private key for the managed device. Additionally, policy information may be included in the configuration information, although this information may also or instead be provided when the managed device registers with the threat management facility.

As shown in step 708, the method 700 may include retrieving credentials for the managed device. In particular, this may usefully include retrieving a one-time passcode for the client identifier, such as by retrieving the one-time passcode from an identity management platform. In general, the identity management platform may be any platform for securely managing user identities in a manner consistent with security of the enterprise network and the use of a zero trust network access architecture. This may, for example, include a third party identity management platform that is securely accessible through a data network, or this may include a third party identity management platform hosted by the enterprise network, either at the threat management facility or some other location on the physical premises of the enterprise network or on a cloud computing platform. The one-time passcode may be any alphanumeric or other string that is valid for a single login session or transaction. More specifically in this case, the one-time passcode may be a login credential useable with the client identifier for a single login by the managed device to the threat management facility during a registration of the managed device to the threat management facility. Use of the one-time passcode during registration of the managed device to the threat management facility may be time limited such that an attempt at a first use of the one-time passcode after a time limit for use of the passcode may result in failure of registration.

As shown in step 710, the method 700 may include creating a supplemental drive image for the managed device. The supplemental drive image may include configuration information and the one-time passcode for registering the managed device. In general, the base image may be configured to boot using data from a second drive. By mounting the supplemental drive image as the second drive, the base image may be used to boot a virtual (or physical) device, and may use configuration information from the supplemental drive image when booting. Thus, a standard or universal base image may be customized for each new instance by using the supplemental drive image to provide custom or unique configuration information. In general, the supplemental drive image may provide startup files, batch files, scripts, or any other code or the like suitable for executing instructions, providing state variables, and so forth for configuration the virtual device instantiated from the base image. Other techniques may also or instead be used, for example, where a cloud computing platform provides a specific tool, programming interface, or protocol for configuring new instances of a virtual device from a base image, provided the credentials and one-time passcode can be passed from an identity management platform for the enterprise network to the cloud computing platform for use in registering a new device with the threat management facility when launching.

As shown in step 712, the method 700 may include providing the base image and the supplemental drive image to an administrator for the enterprise network. This may include providing a link to downloadable files for the base image and the supplemental drive image. By way of non-limiting example, the base image may be distributed as an Open Virtual Appliance (OVA) package containing an archive file such as a tar archive file with an Open Virtualization Format directory inside. The OVA package conforms to an open standard, and may be used to instantiate and boot a virtual device on a virtualization platform such as VMWare ESX or Microsoft HyperV. The supplemental drive image may be provided as an ISO image containing data structured as a duplicate of the data as it would be formatted on an optical disk. The ISO image can be copied to a virtual CDROM drive or the like on the virtual device and be used for configuration of the virtual device when it boots from the OVA. In embodiments, the ISO image may be formatted based on a type of virtualization platform and/or cloud computing platform on which the virtual device is to be hosted.

Providing the images may include an automation of one or more of the following steps in order to continue with the creation, launch, and registration of the virtualized device without further user intervention. For example, providing the base image and the supplemental drive image to the administrator may include automatically loading the base image to a virtualized boot device and loading the supplemental drive image onto a virtualized drive for the virtualized boot device.

As shown in step 714, the method 700 may include receiving the base image and the supplemental drive image. This may, for example, include downloading the images using a link in an administrative console, a command line file transfer, or any other technique.

As shown in step 716, the method 700 may include loading the base image and the supplemental drive image on to a boot device such as a physical device hosted on the premises for the enterprise network a virtualized device hosted on a cloud computing platform for the enterprise network. In one aspect, the images may be automatically loaded onto a virtual device for the administrator after the initial request, with requiring an explicit, additional receiving step such as step 714.

As shown in step 718, the method 700 may include booting a boot device for the managed device from the base image. This boot may be manually initiated by the administrator, or this boot may be automatically initiated in response to a preceding step by the administrator such as requesting the new device or loading the images onto a host. In general, the base image may include a startup instruction to obtain configuration information or other startup data or instructions from a separate drive such as a physical or virtual CD-ROM drive, more specifically, the drive containing the supplemental drive image. The data stored in the supplemental drive image may cause a managed device booted from the base image to responsively register with the threat management facility using the client identifier and the one time pass code from the identity management platform.

As shown in step 720, the method 700 may include receiving a registration request for the managed device at the threat management facility. In general, this request is separate from the initial request by the administrator to provision the managed device. However, in one aspect, the second request may automatically be initiated, e.g., by the threat management facility, in response to the initial request by the administrator to provision the managed device.

As shown in step 722, the method 700 may include responsively authenticating the managed device with the identity management platform using the one-time passcode and, with the successful authentication using the credentials (client identifier and one-time passcode), registering the managed device with the threat management facility. In one aspect, one or more of these registration steps may be automatically performed in response to the initial request by the administrator for the managed device. Thus, in one aspect the method 700 may include automatically authenticating the client identifier with an identity management platform using the one time pass code and, in response to a successful authentication with the identity management platform, automatically registering the managed device with the threat management facility. Other steps consistent with registration of the managed device may also or instead be performed in response to a successful authentication. For example, in one aspect an access token and refresh token may be generated for authenticating a managed device for communication with cloud platforms hosting the threat management facility and/or the managed device.

An example of managed device registration process as described herein may include: booting the gateway via the base image, wherein the base image includes functionality to mount and access a second drive; executing a registration function on the gateway booted from the base image that accesses a client identifier and a one-time passcode, among other things on the mounted second drive and requests authentication to the threat management facility using at least the accessed client identifier and one-time passcode; validating the authentication request at the threat management facility and providing information to the gateway, such as: (i) a locations (e.g., URL) of a zero trust network architecture Proxy and a ZTNA push notification server (e.g., URL), where the respective locations may be based on a region associated with the client identifier; and (ii) a temporary code/token for accessing the ZTNA Proxy URL that encodes a customer identifier, the client identifier, code expiration conditions, and a scope (e.g., for the ZTNA); sending a temporary token from the gateway in a message that includes its assigned client identifier and IP address to the ZTNA Proxy; validating the code with the ZTNA proxy, such as by checking a signature of the code against a cached public key and notifying the threat management facility of the newly established gateway for onboarding; and accepting the newly established gateway at the threat management facility either automatically or through an action by an administrator (e.g., to accept service requests), after which the gateway can begin operation as a managed device, such as by requesting and accepting services that may be managed by the threat management facility according to a security policy and the like.

According to the foregoing, there is disclosed herein a system including an identity management platform supporting authentication in a zero trust network environment and a threat management facility for an enterprise network, the threat management facility hosted on a cloud computing platform and the threat management facility including a processor and memory storing computer executable instructions. The computer executable instructions may configure the threat management facility to perform the steps of: receiving a request from an administrator for the enterprise network to configure a managed device that supports zero trust network access to one or more applications for the enterprise network; retrieving a base image for the managed device, the base image including a bootable, unconfigured image of the managed device; retrieving configuration information for the gateway from the threat management facility, the configuration information including a client identifier for the managed device; retrieving a one-time passcode for the client identifier from the identity management platform; creating a supplemental drive image for the managed device, the supplemental drive image including the configuration information and the one-time passcode for the managed device, wherein the base image is configured to boot using data from a drive that contains the supplemental drive image; and providing the base image and the supplemental drive image to the administrator.

FIG. 8 shows an administrative console for adding an application gateway for an enterprise network. In general, the administrative console may provide a user interface 800 for adding an application gateway or other managed device. The user interface 800 may include fields for inputting configuration information used to customize or otherwise configure the managed device. For example, the user interface 800 may include fields for entry of a Fully Qualified Domain Name (FQDN), an application domain, and whether the domain uses a static or dynamic (from DHCP) IP address. The user interface 800 may also provide fields for entry of a Wide Area Network IP address, along with a subnet mask and a default gateway. Other information, such as whether Local Area Network IP addresses are dynamic or static, and authentication information such as a certificate and/or private key for the gateway, may also be provided. In one aspect, a user configuring the managed device may be asked to manually enter all address and configuration information. In another aspect, some or all of the data may be automatically provided, or a user may be assisted in completing the information, e.g., by providing top level domain name information, drop down lists for available information (e.g., suggested addresses/names, automatically generated certificates/keys, and so forth), or other automated assistance in providing configuration information. In general, the user interface 800 may be hosted by the threat management facility or any other suitable server or the like, and may be presented to a user using any corresponding web technologies or the like.

The above systems, devices, methods, processes, and the like may be realized in hardware, software, or any combination of these suitable for a specific application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made without departing from the spirit and scope of this disclosure and are intended to form a part of the invention as defined by the following claims.

What is claimed is:

1. A method for deploying a centrally managed gateway for zero trust network access, the method comprising:
   retrieving a base image for a zero trust network access gateway, the base image including a bootable image of the zero trust network access gateway;
   retrieving configuration information including a client identifier for the zero trust network access gateway from a threat management facility;
   retrieving a one-time passcode for the client identifier from an identity management platform;
   creating a supplemental drive image for the zero trust network access gateway, the supplemental drive image including the configuration information and the one-time passcode for the zero trust network access gateway; and
   booting the zero trust network access gateway from the base image and the supplemental drive image, wherein the zero trust network access gateway is configured to register with the threat management facility using the client identifier and the one-time passcode stored on the supplemental drive image.

2. A system comprising:
   an identity management platform comprising one or more servers supporting authentication in a zero trust network environment; and
   a threat management facility for an enterprise network, the threat management facility hosted on a cloud computing platform and the threat management facility including a processor and memory storing computer executable instructions that configure the threat management facility to perform the steps of:
      retrieving a base image for a zero trust network access gateway, the base image including a bootable image of the zero trust network access gateway,
      retrieving configuration information including a client identifier for the zero trust network access gateway from the threat management facility,
      retrieving a one-time passcode for the client identifier from the identity management platform,
      creating a supplemental drive image for the zero trust network access gateway, the supplemental drive image including the configuration information and the one-time passcode for the zero trust network access gateway, and
      causing the zero trust network access gateway to boot from the base image and the supplemental drive image, wherein the zero trust network access gateway is configured to register with the threat management facility using the client identifier and the one-time passcode stored on the supplemental drive image.

3. The system of claim 2 further comprising a second cloud computing platform independent from the cloud computing platform, wherein causing the trust network access gateway to boot from the base image and the supplemental drive image includes causing the zero trust network access gateway to boot on the second cloud computing platform.

4. A computer program product comprising a non-transitory computer readable medium that includes computer executable code that, when executing on one or more computing devices, performs the steps of:
   retrieving a bootable image for a managed device;
   retrieving configuration information including a client identifier for the managed device from a threat management facility;
   retrieving a one-time passcode for the client identifier from an identity management platform;
   creating a supplemental drive image for the managed device, the supplemental drive image including the configuration information and the one-time passcode for the managed device; and
   causing the managed device to boot from the bootable image and the supplemental drive image, wherein the managed device is configured to register with the threat management facility using the client identifier and the one-time passcode stored on the supplemental drive image.

5. The computer program product of claim 4 wherein causing the managed device to boot includes automatically loading the bootable image to a virtualized boot device and loading the supplemental drive image onto a virtualized drive for the virtualized boot device.

6. The computer program product of claim 4 further comprising code that, when executing on the one or more computing devices, causes the threat management facility to perform the steps of: automatically authenticating the client identifier with identity management platform using the one-time passcode and, in response to a successful authentication with the identity management platform, automatically registering the managed device with the threat management facility.

7. The computer program product of claim 4 wherein the managed device is a virtual device.

8. The computer program product of claim 4 wherein the bootable image is in a virtualization format.

9. The computer program product of claim 4 wherein the supplemental drive image is an ISO image for a CD-ROM drive of a virtual machine.

10. The computer program product of claim 4 wherein the configuration information includes one or more of local area network configuration information, wide area network configuration, and domain name service information.

11. The computer program product of claim 4 wherein the configuration information includes one or more of a name for the managed device and a fully qualified domain name for the managed device.

12. The computer program product of claim 4 wherein the configuration information includes one or more of a certificate for the managed device and a private key for the managed device.

13. The computer program product of claim 4 wherein the managed device includes a gateway for zero trust network applications.

14. The computer program product of claim 4 wherein the managed device includes a firewall for an enterprise network associated with the threat management facility.

15. The computer program product of claim 4 wherein the managed device includes one or more of a wireless access point and a switch for an enterprise network associated with the threat management facility.

16. The computer program product of claim 4 wherein the managed device is a virtualized device executing in a virtualization environment.

17. The computer program product of claim 4 wherein the managed device is physically hosted on premises for an enterprise network associated with the threat management facility.

18. The computer program product of claim 4 wherein the threat management facility is hosted on a cloud computing platform.

19. The computer program product of claim 4 wherein the managed device is hosted on a cloud computing platform.

20. The computer program product of claim 4 wherein the threat management facility is hosted on a first cloud computing platform and the managed device is hosted on a second cloud computing platform independent of the first cloud computing platform.

* * * * *